Oct. 6, 1959     S. J. GARTNER     2,907,141
EXHAUST MACHINE CHUCK
Original Filed Dec. 24, 1946     3 Sheets-Sheet 1
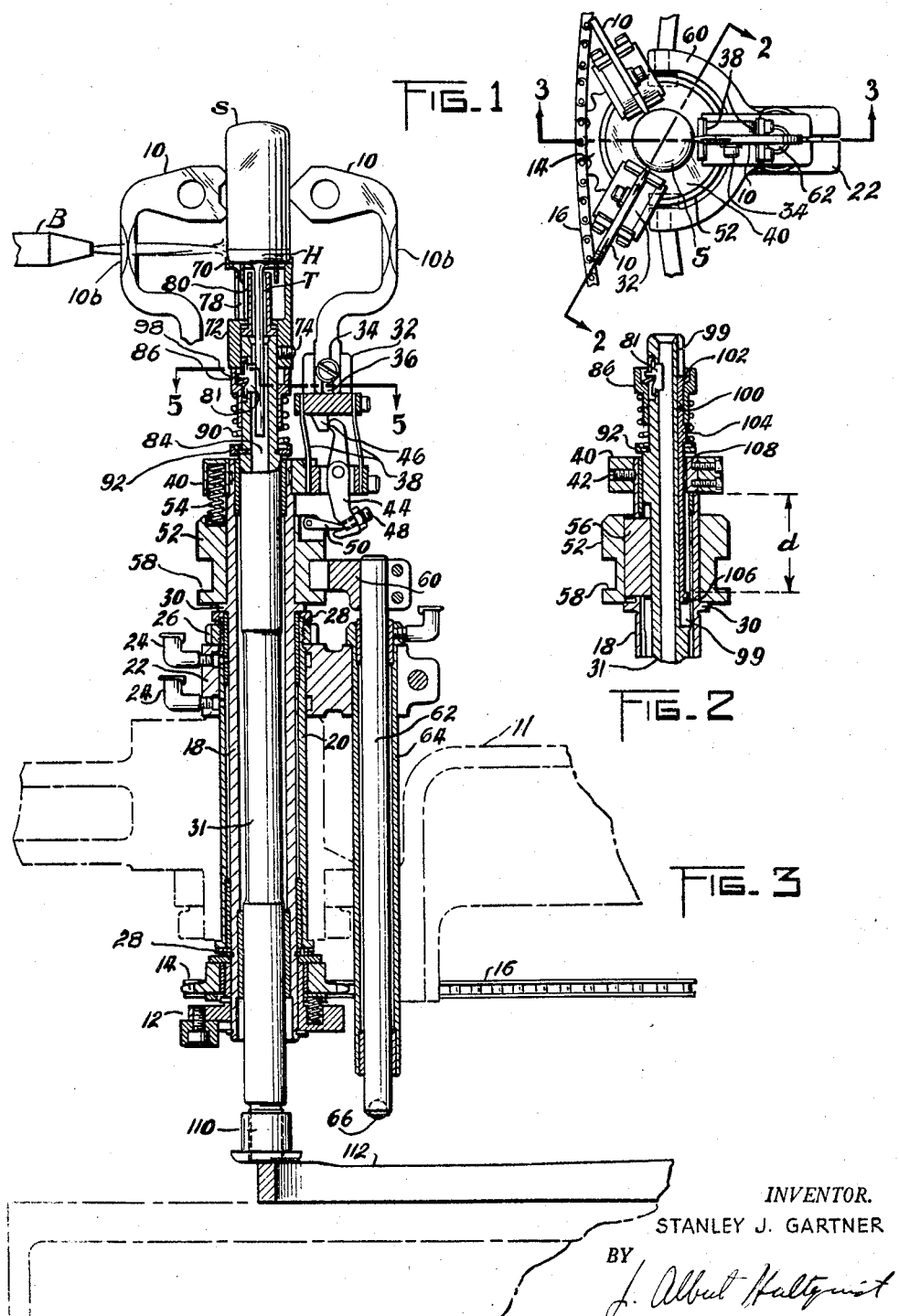
INVENTOR.
STANLEY J. GARTNER

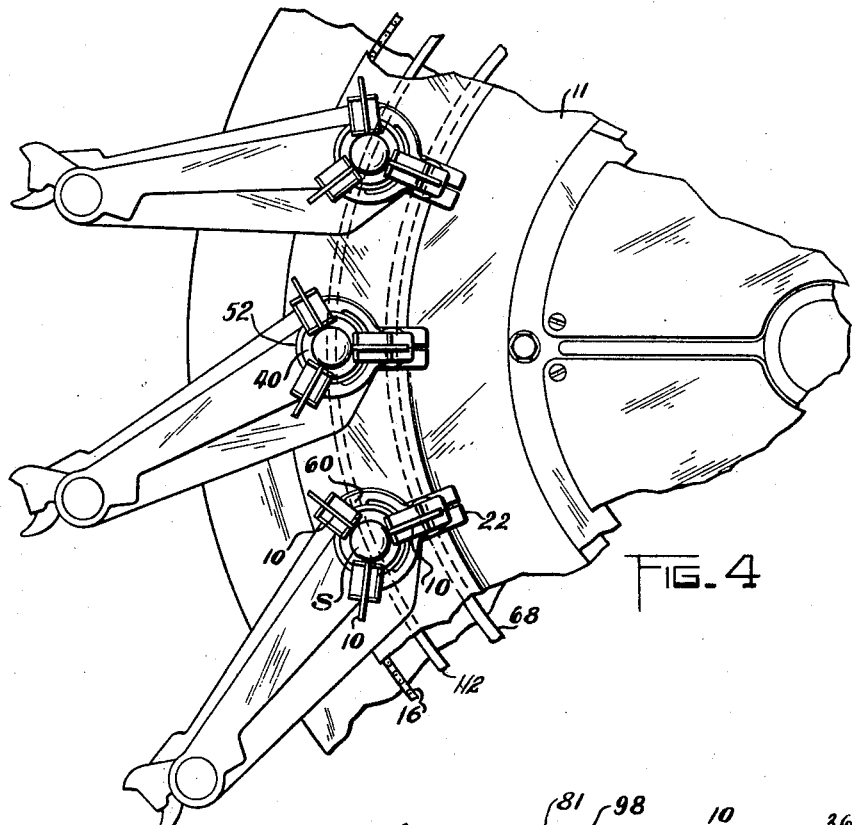
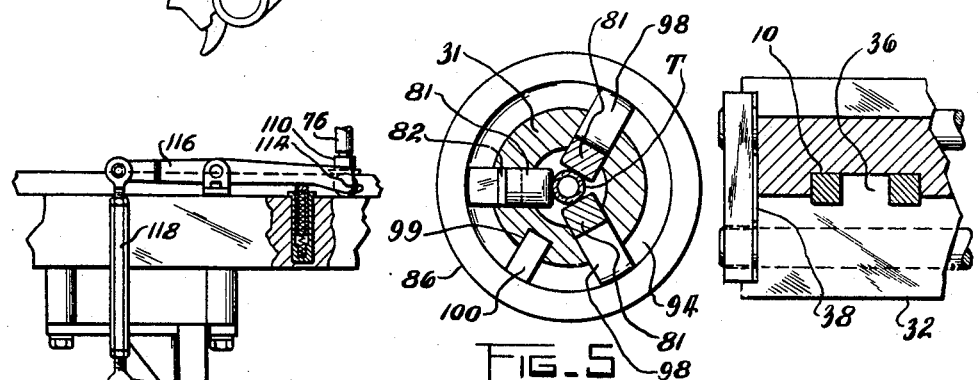
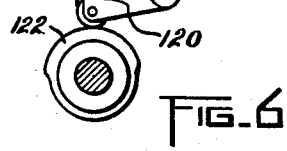

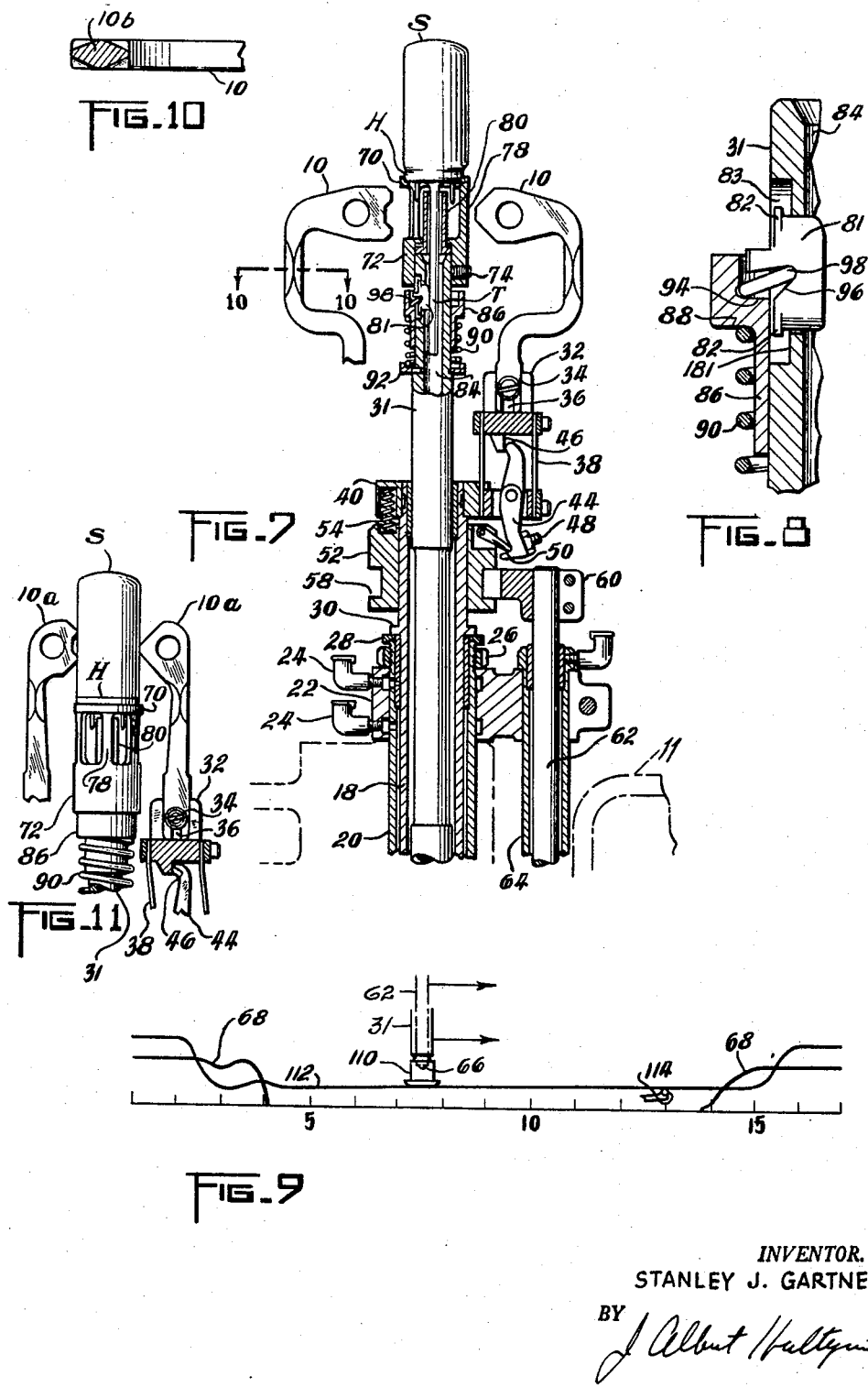

United States Patent Office 2,907,141
Patented Oct. 6, 1959

2,907,141
EXHAUST MACHINE CHUCK

Stanley J. Gartner, Emporium, Pa., assignor, by mesne assignments, to Sylvania Electric Products, Inc., Wilmington, Del., a corporation of Delaware Original application December 24, 1946, Serial No. 718,152, now Patent No. 2,661,576, dated December 8, 1953. Divided and this application October 14, 1953, Serial No. 394,587

7 Claims. (Cl. 49—64)

This invention relates to the manufacture of radio tubes and like devices.

This application is a division of application Serial No. 718,152, filed December 24, 1946, which matured into U.S. Patent No. 2,661,576 of December 8, 1953.

Among the objects of the invention are to provide: new and useful chucks suitable for spindles in processing apparatus; an improved form of chuck for gripping a glass exhaust tube; a chuck for reliably gripping brittle articles with a minimum of impact; a pair of coaxial chucks to grip a pair of assembled parts with the supporting and operating mechanism of both chucks located at the same end of the parts assembly; a chuck the jaws of which may be interposed in the path of flames without impairing the uniform heating of the parts gripped; and an organization, having generally improved features, for making a glass seal between a pair of cylindrical parts.

The illustrative embodiment of the invention is for sealtogether a "shell" and a "mount" to constitute an unevacuated envelope encasing electrodes in a well-known process of manufacturing radio tubes and the like devices. In this process the shell is usually a glass cylinder closed at one end, although it may be of metal having its edge prepared for a glass seal; and the mount is made up of a cupped or flat glass header larger enough to close the open end of the shell, a number of metal leads extending perpendicularly through the header, the electrodes or "mount assembly" supported on the leads above the header, and an exhaust tube extending centrally from below the header. The unit comprising the exhaust tube, the header and the metal leads, before the mount assembly is attached, is termed the "stem," although the entire assembly after the mount assembly is attached is frequently called the stem (rather than the mount as defined above). In describing the illustrative embodiment of the invention the terms "mount" and "stem" are used interchangeably.

In prior art sealing machines there were multiple spindles each comprising a stem chuck and a shell chuck, the stem chucks being carried by a turret and the shell chucks being axially aligned with the stem chucks and carried from a ponderous superstructure, to expose the opposed shell and stem edges to the sealing flames. It is a further object of the present invention to eliminate the superstructure, for many attendant advantages, without impairing the proficiency of the sealing machine.

Further features of novelty and objects will be apparent from the following detailed disclosure of a preferred embodiment of the invention with reference to the attached drawings, wherein:

Fig. 1 is a plan view of a spindle comprising coaxial chucks embodying the invention;

Fig. 2 is a sectional view along the line 2—2 of Fig. 1 illustrating a preferred form of exhaust-tube chuck;

Fig. 3 is a longitudinal sectional view along the line 3—3 of Fig. 1;

Fig. 4 is a fragmentary plan view of the machine;

Fig. 5 is a sectional view along the line 5—5 of Fig. 3;

Fig. 6 is a detailed view of a mechanism for reciprocating the exhaust-tube chuck during the formation of the header-to-shell seal;

Fig. 7 is a fragmentary sectional view similar to Fig. 3, with the parts shown in their configuration at the time of release of the fused envelope;

Fig. 8 is an enlarged detail view of a portion of the mechanism of Fig. 2;

Fig. 9 is a timing chart;

Fig. 10 is a sectional view along the line 10—10 in Fig. 7; and

Fig. 11 is a fragmentary lateral view of a spindle showing a modified form of shell chuck jaws.

Referring now to the drawings, the preferred forms of envelope chuck, exhaust-tube chuck, and the arrangement of these two chucks in relation to each other and to their operating mechanisms will be described. The assembly of chucks and their supports are mounted for rotation, and constitutes a spindle.

In Figs. 1 and 3 shell S is shown centered on the spindle by means of three jaws 10. The shell is held in axial alignment with a stem (comprising header H, exhaust tube T, external pins, and a mount assembly within the shell) so that flame from burner B may soften the opposed edges of the header and the shell to form a sealed envelope. The header is supported and the exhaust tube is gripped on the spindle which is intermittently indexed with turret 11 (Fig. 4). At most positions of the turret each spindle is rotated about its axis.

Rotation of each of the spindles is effected by means of the usual friction clutch 12 which is engaged with pinion 14, maintained in rotation when the spindle is in the firing positions by means of a chain 16 (Figs. 3 and 4). Clutch 12 is secured to drive a generally tubular member 18 which is carried in the turret by means of bushing 20. Pinion 14 is rotatable on member 18. With pinion 14 in rotation, clutch 12 is arrested under certain circumstances, to lock the spindle, by a latch (not shown) adjacent the turret. Above the turret is a bearing block 22 for each of the spindles through which lubrication may be supplied to the respective members 18 by oil cups 24. Bushings 20 are externally threaded at their upper ends and flanged at their lower ends, so that they can be locked to the turret by castelated nuts 26, thus clamping blocks 22 in place.

Each member 18 has an annular rib 30 supported on washer 28 above bushing 20, and contains a shaft 31 for supporting header H and for operating the gripper for exhaust tube T. Above each rib 30 there is a mechanism for supporting and operating jaws 10 for the shells.

Shell chuck

In the prior art, the mechanism for supporting and operating the shell jaws was located vertically above the spindle. With that arrangement there was no barrier between burner B and the opposed portions of shell S and header H. However, for the purposes of the present invention the supporting and operating mechanisms for the jaws are located below the header support. In this way it is feasible to reduce the over-all height and mass of the equipment, to improve the accessibility of the spindles, and generally to simplify the operating mechanisms. Shell jaws 10 are supported from below and, in one form are bowed outward, resembling question marks, contacting the shell S at their upper extremities. An intermediate portion 10b of each jaw 10 is transversely streamlined at the level of the burners B by being tapered in opposed directions, that is, in the direction toward the flame and the direction away from the flame (Fig. 10), for uniform heating of the glass edges and (later) the seal. But for this streamlining jaws 10 might form a baffle at three parts of the seal opposite the three jaws shown. In modified construction the jaws 10a are streamlined but not bowed (Fig. 11). In both forms of the invention, the streamlining is achieved by relieving away or cutting away corners of the intermediate portions of the jaws whereby the jam cross section of the jaws is reduced to present minimal obstruction to exposure of the article to flame.

Two of the jaws 10 have two points at which they contact shell S whereas the third has but a single point of contact. In this way the two-point jaws form a sort of vertical cradle for supporting shell S against the pressure applied by the single-point-of-contact jaw when all three jaws are pressed toward each other.

Jaws 10 are supported on blocks 32 for vertical adjustment by means of screw 34 in block 32. Each of the jaws is slotted at 36 to accommodate this screw, and each of the jaws is confined within a vertical groove in block 32 (Fig. 5).

Jaws 10 are so supported and operated as to allow the header support to raise the radio tube with its complete seal into a position of clearance for removal (Fig. 7) and to allow renewed loading of a stem and of a shell thereon. The assembly is then lowered properly within jaws 10 and the shell is gripped. According to the present invention the shell jaws are supported and operated from below in such manner as to cause them to approach radially and without any pivotal swing toward the spindle axis. This is an important consideration, for with appreciable swing the jaws would develop considerable momentum. This would result in hazardous impact when the jaws engage shell S which commonly is of glass. The support and operating mechanism to be described is provided so that the jaws may be controlled from a position not merely below their point of engagement with the shell S but also below the level of burner B.

Each block 32, which carries its jaw 10, is mounted for substantially horizontal shifting on pairs of leaf springs 38, these leaf springs functioning as a parallel linkage to restrict jaws 10 against pivotal motion, and to restore jaws 10 to the position in Fig. 7 when released by the operating mechanism. At their lower extremities springs 38 are secured to a control means biasing the jaws radially inward and releasing them for movement radially outward, which will now be described. There is provided a support 40 for the springs 38 which is, in turn, secured to rotary tubular member 18 by means of a set-screw 42 (Fig. 2).

Support 40 pivotally carries a coupling means including one lever 44 for each of the three jaws 10. At its upper end each lever 44 contacts a depending portion 46 of block 32. At its lower end each lever 44 carries an adjustment screw 48 and lock nut, which screw transmits thrust from arm 50 to lever 44 and the jaws 10. The coupling means further includes three arms 50, one for each lever 44, supported on reciprocable ring member 52 which is slidable along tubular member 18 and is normally depressed against rib 30 by compression spring 54. Reciprocable ring member 52 is restricted against rotation with respect to member 18 by key 56 (Fig. 2) confined within opposed keyways in ring 52 and member 18. The reciprocable ring member 52 of each of the spindles is grooved at 58 for snug engagement by yoke 60 (Figs. 1, 3, 4 and 7), clamped to the upper end of a slide 62 in the form of a slidable rod at the lower end of which is a socket and an anti-friction ball 66. This rod is slidable in lubricated bushing 64 which is clamped within a slotted bore in block 22.

In operation, the spindles are carried intermittently in a circular path around the machine from one station to another. They are rotated continuously, except at the loading and unloading stations. In the course of this travel of the spindles, all of the slides 62 are carried above a stationary cam-track 68 on the machine base (Figs. 4 and 9). Normally, as shown in Fig. 3, slide 62 is left unsupported at its lower extremity, and compression spring 54 in addition to the weight of ring 52, yoke 60 and slide 62 cause arm 50 to swing counter-clockwise (compare Figs. 7 and 3) thereby pivoting lever 44 counterclockwise, and moving all three jaws 10 into contact with shell S. This motion occurs just as cam-follower 66 drops off cam 68 (Fig. 9). The spring and weight assembly causes firm engagement of the jaws with shell S, yet resiliency of the leaf springs and the jaws accommodates variations in the diameter of the shell. Jaws 10 move through a relatively short path into contact with the shell, the upper ends of the jaws traveling the same distance as blocks 32 and in a parallel path. The impact of the jaws as they contact shell S is vastly reduced as compared to the impact of any practical form of jaws which move pivotally toward the shell.

When slide 62 is raised, leaf-springs 38 move jaws 10 radially outward to release the shell.

*Stem chuck and support*

Header H is supported on a ring 70 which forms part of an adapter 72 secured by set screw 74 to the upper end of innermost tube 31 of the spindle. Ring 70 is spaced from the body of adapter 72 by three legs 78, whereby preheating and cooling gases may be directed against the bottom of header H. Exhaust tube T is protected against these gases by tubular baffle 80 which rests on the top of tube 31, and forms part of the adapter. Certain aspects of this adapter are disclosed and claimed in copending U.S. application Serial No. 693,146, filed August 26, 1946, by Clayton R. Cowley, which matured into U.S. Patent No. 2,484,688 of October 11, 1949.

Tube 31 is slotted radially near its top at three points, to accommodate an equal number of grippers 81 (Fig. 5). Each slot (one of which is indicated at 83 in Fig. 8), has a greater axial extent at the outside surface of tube 31 than along its bore 84, thus forming a step 181. Extensions 82 on grippers 81 falling against a step such as 181 limit the inward movement of the grippers so that they cannot fall into the bore of tube 31. A sleeve 86 is slidable along tube 31 and surrounds grippers 81. Sleeve 86 is externally shouldered at 88 to provide a bearing surface against which compression spring 90 may act so as normally to urge sleeve 86 upward. Spring 90 reacts against a cup 92 keyed against rotation and resting on a shoulder of tube 31. Sleeve 86 has an internal shoulder 94 (Figs. 5 and 8). Between shoulder 94 and a V-shaped recess 96 in each gripper 81 there is an interponent 98. When spring 90 is allowed to elongate, the interponent 98 of Fig. 8 is rotated clockwise into a more-or-less horizontal position, forcing the associated gripper 81 radially toward exhaust tube T. The other two grippers are simultaneously moved toward tube T. Sleeve 86 is limited in its upward travel by the setting of adapter 72. Nevertheless, in the event that the adapter is removed for substitution, sleeve 86 will be prevented from unintentionally sliding off the end of tube 31 by the coaction of interponents 98 with grippers 81, and by these in turn with radial slots in tube 31.

Tube 31 is provided with a keyway 99 (Fig. 5) for key 100, and this key is constrained to move axially with sleeve 86 by virtue of extension 104 just underneath sleeve 86. Overhanging portion 102 (Fig. 2) on key 100 is adapted to rest on shoulder 94 and arrest upward movement of sleeve 86 at a predetermined point in its travel. Keyway 99 extends axially along tube 31 to a point somewhat below rib 30. Key 100 similarly extends downward along tube 31 and has another lateral extension 106. Tube 18 is relieved at its upper end (Fig. 2) to accommodate a stop 108 which extends from fixed ring 40 into keyway 99 so as to limit the upward travel of lateral extension 106.

The operation of jaws 10 has been described above. It will be recalled that, during the portion of the cycle when the header and the envelope are to be loaded into the upper end of the spindle, as well as when the fused product is to be removed, slide 62 is elevated to raise the reciprocable ring member 52 for opening jaws 10 to the necessary extent. The parts are shown in this configuration in Fig. 7, from which it will be apparent that jaws 10 remain at a constant level. While jaws 10 are open it is so arranged that the grippers 81 for exhaust tube T shall be released for movement radially outward, and adapter 72 shall be raised considerably relative to jaws 10 to facilitate loading and unloading operations. The mechanism described above for operating grippers 81 causes engagement thereof with exhaust tube T as soon as adapter 72 and its supporting tube 31 have commenced their descent, and maintains this engagement until the processing has been completed and elevation of tube 31 is nearly complete.

Tube 31 is provided with a keyway 99 (Fig. 5) for key during the initial and the final portions of the cycles. This is effected by the engagement of adjustable cam follower 110, screwed to the lower end of tube 31, with stationary cam track 112 (Figs. 3, 4 and 9) on the machine base. So long as cam follower 110 remains opposite a low portion of cam 112 spring 90 is free to force sleeve 86 relatively upward and cause engagement of grippers 81 with exhaust tube T. However, when tube 31 is raised, key 100 is carried with it until lateral extension 106 is arrested by stop 108. This arrests the continued upward movement of sleeve 86 because portion 102 butts against shoulder 94. The relative motion between sleeve 86 and ascending tube 31, releases grippers 81 to permit removal of the fused envelope and insertion of a new header H with its exhaust tube T. Tube 31 is permitted to rise a distance *d* (Fig. 2) while firmly gripping the exhaust tube and similarly to descend distance *d* with the exhaust tube gripped. When tube 31 is forced above this limit the exhaust-tube chuck is opened to release or receive an exhaust tube.

The exhaust tube chuck described has several important advantages. Since it is independent of any large mass for operation, its operation is relatively free of the shocks which are to be expected from the sudden application of a gripper-operating weight which characterizes comparable prior art mechanisms. The gripper described so operates as to accommodate exhaust tube irregularities, yet it grips firmly, and it is effective during the fast vertical travel of the article support. In this way it maintains the header H properly seated on adapter ring 70 for alignment with the burners, against inertia effects during reciprocation of tube 31. In pursuing my objective of supporting the shell chuck 10 from below, I have provided the header support with a long stroke, and I have devised an exhaust-tube chuck or gripper that is effective after the initial descent of the adapter and until the final part of its subsequent ascent.

Cycle of operations

Referring now to Fig. 9 the complete cycle of operation of the sealing machine will be described. The timing chart shown there is divided into 16 intervals, whereby each of 16 spindles may in stepwise succession be positioned at any given processing station. The timing chart actually shows the contour of the stationary cam tracks mounted on the machine bed along which cam followers 66 and 110 are moved by the spindle-supporting turret. During the travel of the spindle from the first to the second station in Fig. 9, jaws 10 and grippers 81 remain retracted and adapter 72 is elevated above jaws 10. During this interval the spindles do not rotate. Header H may be inserted, and shell S may be placed above the header which at this stage of manufacture carries the internal electrode assembly of the radio tube or like device. During the transit of any given spindle from the second to the third station, cam-follower 110 travels along cam surface 112, initially causing grippers 81 to engage exhaust tube T, and then lowering the shell-and-header assembly into position for engagement by jaws 10. At the third station, by virtue of the shape of cam 68 which operates cam-follower 66, jaws 10 are moved firmly but with a minimum of impact into engagement with shell S to center the shell roughly on header H. Thereafter, during the indexing operation from the third to the fourth station, jaws 10 are opened, then closed again, and finally adapter 72 is raised very slightly so as to press header H firmly into abutment with shell S. When shell S is thus held at a definite level by closed jaws 10, the stem chuck-and-support 31 is allowed to drop slightly between stations 4 and 5 to space shell S slightly above header H. Rotation of the spindles and firing are then commenced. By virtue of key 56 (Fig. 2) drive is transmitted not only to ring 52 but also to shaft 31, having a keyway therein, for driving the two chucks in perfect synchronism. This is an additional advantage of supporting both chucks from one end of the shell-and-stem assembly.

From the fifth station until the twelfth, various burners are brought to bear on the edges of the shell and the header so as to preheat them and ultimately to fuse their edges. Preheating flames are optionally brought to bear on the bottom of header H, to minimize internal strains. By the time any spindle reaches station 13 the edges of shell S and header H have already been fused. Roller 114 reciprocates vertically under cam follower 110 of the header support, thereby to move the fused edge of the header into contact with the soft edge of the shell, forming the seal, and promptly thereafter to allow cam follower 110 to drop so as to stretch the seal. This reciprocation is of the order of $\frac{1}{16}$ of an inch, and is achieved by the mechanism in Fig. 6. Roller 114 is carried at one end of lever 116 which is pivoted at its center and at its opposite end by turnbuckle 118 constituting an adjustable link between lever 116 and cam follower 120 of rotary cam 122. During those intervals when the turret is at rest with a spindle at station 13, cam 122 is rotated once to make the seal and to stretch the seal.

During the travel of a spindle from station 13 to station 15, the seal is allowed to cool. A rise in cam 68, between stations 14 and 15 causes jaws 10 to be retracted from shell S. Thereafter the sealed envelope is carried upward rapidly, and during the slow, final elevation of adapter 72, exhaust tube grippers 81 are released to allow removal of the product.

The chucks described cooperate to constitute the spindle of an improved sealing machine, but it will be recognized that they may also be separately useful in other sealing machines and in other combinations.

What I claim is:

1. A chuck including a number of radially movable jaws and a number of pairs of parallel radially spaced leaf springs, each of said jaws being carried jointly by a pair of said springs.

2. A chuck including a number of radially movable jaws, a number of pairs of parallel radially spaced leaf springs, and means including an axial slide for moving said jaws radially, each of said jaws being carried jointly by a pair of said springs.

3. A rotatable chuck adapted to support an article in position for exposure to flame comprising a plurality of axially extending jaws, each of said jaws having an article engaging portion at one end thereof, a support at the other end of each of said jaws, the intermediate portions of each of said jaws having a cross-section which is tapered in opposed directions for presenting minimal obstruction to exposure of said article to flame.

4. A rotatable chuck adapted to support an article in position for exposure to flame comprising a plurality of axially extending jaws each having a radially extending intermediate portion of substantially rectangular cross section, each of said jaws having an article engaging portion at one end thereof, a support at the other end of each of said jaws, said intermediate portion of each of said jaws having a cross-section tapered in opposed direction for presenting nominal obstruction to exposure of said article to flame.

5. A rotatable chuck adapted to support an article in position for exposure to flame comprising a plurality of axially extending jaws, each of said jaws having an article engaging portion at one end thereof, a support at the other end of each of said jaws including a pair of parallel leaf springs, the intermediate portion of each of said jaws having a cross-section tapered in opposed directions for presenting nominal obstruction to exposure of said article to flame.

6. A chuck for supporting an elongated article comprising a plurality of jaws each movable radially of and at right angles to the longitudinal axis of said article, a mount for each of said jaws including vertically extending leaf springs arranged parallel to each other and to said longitudinal axis, and means operative to advance said jaws into gripping relation to said elongated article and arranged to allow for periodic retraction of said jaws from gripping relation to said article, said means including a slide movable through a prescribed thrust, a reciprocable member operatively connected to and displaceable by said slide, an arm mounted on said reciprocable member for pivotal movement when said reciprocable member is displaced, and a lever mounted for rocking movement and normally in urged engagement with and deforming said leaf springs for biasing said jaws into gripping relation to said elongated article, said lever being controlled by pivotal movement of said arm and rocked in a direction to release said leaf springs whereby said jaws retract in response to movement of said slide through said prescribed thrust.

7. A chuck for supporting an elongated article comprising a plurality of jaws each movable radially of and at right angles to the longitudinal axis of said article, the intermediate portion of each of said jaws having a cross-section which is tapered in opposed directions, a mount for each of said jaws including vertically extending leaf springs arranged parallel to each other and to said longitudinal axis and means operative to advance said jaws into gripping relation to said elongated article and arranged to allow for periodic retraction of said jaws from gripping relation to said article, said means including a slide movable through a prescribed thrust, a reciprocable member operatively connected to and displaceable by said slide, an arm mounted on said reciprocable member for pivotal movement when said reciprocable member is displaced, and a lever mounted for rocking movement, and normally in urged engagement with and deforming said leaf springs for biasing said jaws into gripping relation to said elongated article, said lever being controlled by pivotal movement of said arm and rocked in a direction to release said leaf springs whereby said jaws retract in response to movement of said slide through said prescribed thrust.

References Cited in the file of this patent

UNITED STATES PATENTS

| Number | Name | Date |
|---|---|---|
| 188,626 | Harcum | Mar. 20, 1877 |
| 351,871 | Lampert | Nov. 2, 1886 |
| 409,483 | Muncaster | Aug. 20, 1889 |
| 614,935 | Conde | Nov. 29, 1898 |
| 1,524,672 | Rabut | Feb. 3, 1925 |
| 1,569,185 | Higgins | Jan. 12, 1926 |
| 1,842,184 | Madden | Jan. 19, 1932 |
| 1,915,005 | Schmidt | June 20, 1933 |
| 1,942,042 | Zimber et al. | Jan. 2, 1934 |
| 2,023,628 | Van Sant | Dec. 10, 1935 |
| 2,107,254 | Horn | Feb. 1, 1938 |
| 2,185,704 | Donovan et al. | Jan. 2, 1940 |
| 2,203,917 | Malloy | June 11, 1940 |
| 2,477,332 | Garbe | July 26, 1949 |

FOREIGN PATENTS

| Number | Country | Date |
|---|---|---|
| 21,199 | Great Britain | Dec. 12, 1891 |
| 390,266 | Great Britain | Apr. 6, 1933 |